Figure 1:
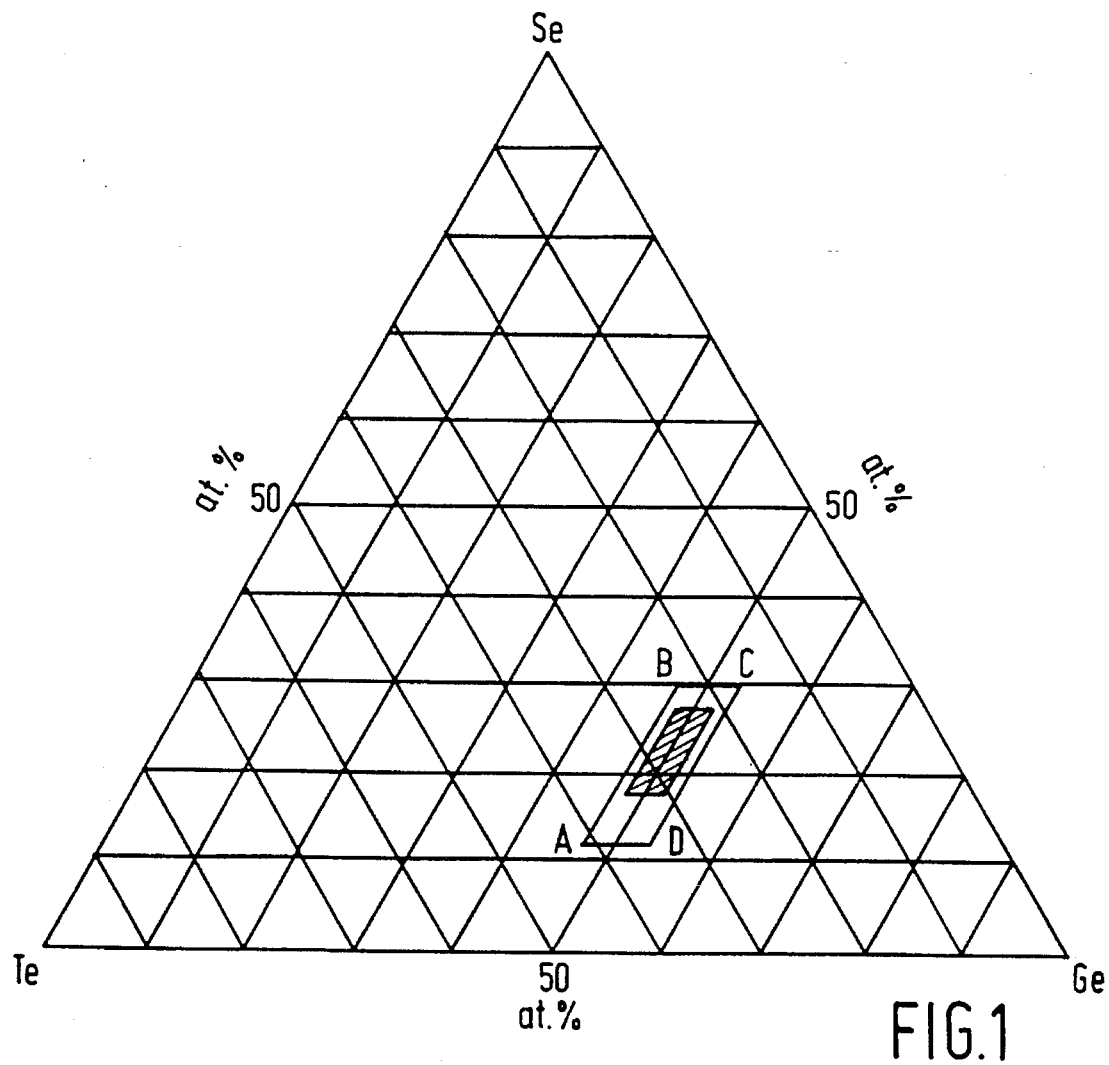

United States Patent [19]

Coombs et al.

[11] Patent Number: 5,604,003
[45] Date of Patent: Feb. 18, 1997

[54] OPTICAL INFORMATION CARRIER

[75] Inventors: James H. Coombs; Wilma van Es-Spiekman; Bernardus A. J. Jacobs; Adrianus P. J. M. Jongenelis, all of Eindhoven, Netherlands

[73] Assignee: U.S. Philips Corporation, New York, N.Y.

[21] Appl. No.: 491,012

[22] Filed: Jun. 15, 1995

[30] Foreign Application Priority Data

Jun. 23, 1994 [EP] European Pat. Off. ............. 94201800

[51] Int. Cl.$^6$ ..................................... B32B 3/00
[52] U.S. Cl. ............... 428/64.1; 428/64.2; 428/64.4; 428/64.5; 428/64.6; 428/457; 428/913; 430/270.1; 430/270.11; 430/270.12; 430/270.13; 430/495.1; 430/945; 369/283; 369/288
[58] Field of Search ............... 428/64.1, 64.2, 428/64.4, 64.5, 64.6, 457, 913; 430/270, 495, 945, 270.1, 270.11, 270.12, 270.13; 369/283, 288

[56] References Cited

U.S. PATENT DOCUMENTS

| | | | |
|---|---|---|---|
| 4,806,952 | 2/1989 | Nishida et al. | 346/108 |
| 5,063,097 | 11/1991 | Hirota et al. | 428/65 |
| 5,147,701 | 9/1992 | Furukawa et al. | 428/64 |
| 5,154,957 | 10/1992 | Yamada et al. | 428/64 |
| 5,348,783 | 9/1994 | Ohno et al. | 428/64 |

FOREIGN PATENT DOCUMENTS

| | | |
|---|---|---|
| 0217293 | 4/1987 | European Pat. Off. . |
| 0286406 | 10/1988 | European Pat. Off. . |
| 0549024 | 6/1993 | European Pat. Off. . |

*Primary Examiner*—Newton Edwards
*Assistant Examiner*—Elizabeth Evans
*Attorney, Agent, or Firm*—Ernestine C. Bartlett

[57] ABSTRACT

A description is given of an optical information carrier comprising a substrate (1), a thin reflective layer (5), a dielectric layer (7), a phase-change recording layer on the basis of GeTeSe (9), a dielectric layer (11), an opaque metal reflective layer (13) and a protective layer (15). The information carrier can be inscribed, erased and read by means of a laser-light beam a and, in the inscribed state, complies with the CD-industrial standard. The recording layer (9) comprises an alloy having the composition $Ge_xTe_ySe_z$, in atom %, wherein $47 \leq x \leq 53$
$17 \leq y \leq 41$
$12 \leq z \leq 30$ and $x+y+z \geq 96$ and, preferably, equal to 100.

9 Claims, 2 Drawing Sheets

OPTICAL INFORMATION CARRIER

The invention relates to an optical information carrier for inscribing, reading and erasing information by means of a laser-light beam, said optical information carrier comprising a substrate carrying a stack of layers, which stack comprises, in succession, a first reflective layer, a first dielectric layer, a recording layer of a phase-change material of an alloy comprising germanium and tellurium, a second dielectric layer and a second reflective layer.

The invention also relates to a method of manufacturing such an optical information carrier.

Known optical information carriers, such as the Compact Disc (CD), Compact Disc Read Only Memory (CD-ROM) and Laser Vision (LV) are provided with information by the manufacturer and can only be read by the user by means of commercially available playback equipment. Other optical information carriers can be inscribed once by the user, for example CD-R (recordable). An information carrier which is erasable and re-inscribable by the user and which can be read in a standard CD player could be used for many applications. Audio, video or data information can be inscribed in the information carrier by the user himself. After an erasing step, new information can be inscribed in the information carrier.

A known type of erasable and re-inscribable optical information carrier has a reversible recording layer of a so-called phase-change material. By locally heating said recording layer with a focused laser-light beam and subsequently cooling it, the state of crystallization of these materials is changed at the location of the laser spot, and a readable bit is formed. Dependent upon the material of the recording layer, amorphous material changes to crystalline material or conversely. Conversion of a crystalline phase to another crystalline phase is also possible. The recording layer is, for example, crystalline and has the property that incident laser light is absorbed.

During inscribing information, the information carrier is moved with respect to a focused laser-light beam which is modulated in accordance with the information to be inscribed. Due to this, quenching takes place in a phase-change recording layer having a crystalline/amorphous phase change and causes the formation of amorphous information bits in the exposed areas of the recording layer which remains crystalline in the unexposed areas. The crystalline material has other optical properties than the amorphous material, so that the inscribed information can be read in reflection as an optical contrast by means of a low-power, focused laser-light beam. In some phase-change materials, the amorphous areas can be reconverted into crystalline areas by heating, so that the inscribed information is erased. Known alloys of this type are on the basis of In—Se, In—Sb—Se, In—Sb—Te, Ge—Te, Se—Sb—Te, Ge—Sb—Te and Ge—Se—Sb—Te. The recording layer can subsequently be re-inscribed.

A prerequisite for reading an inscribable and erasable information carrier in a standard CD player is that said information carrier is compatible with said CD player, i.e. the information carrier in the form of a disc-shaped plate must comply with the industrial standard for CD systems, hereinafter referred to as CD-industrial standard. This standard comprises CD-DA (digital audio), CD-ROM, CD-i (interactive), CD-photo, CD-V (video) and CD-R (recordable). This means, amongst other things, that when use is made of an information carrier of the phase-change type, the initial reflection $R_H$ of uninscribed (in practice, crystalline) areas of the information carrier and the modulation m must have a specific minimum value. In the case of a parallel laser-light beam having a wavelength of approximately 785 nm which is perpendicularly incident via the substrate, $R_H$ must be at least 70%. When an inscribed information carrier is read by means of a focused laser-light beam, reflection differences of the amorphous bits with respect to the crystalline recording layer bring about a modulated laser-light beam which is subsequently converted by a detector into a modulated photocurrent in accordance with the coded, inscribed digital information. The digital information originates from amorphous bits having a width of approximately 1μ and, dependent upon the linear disc velocity, a length which varies between 0.9 and 3.3 μm. The modulated photocurrent is a HF signal whose lowest fundamental frequency is 196 kHz. The peak-to-peak value of the photocurrent is designated as $I_{11}$ and the peak value of the HF signal associated with 196 kHz is designated as $I_{peak}$. The modulation m is defined as:

$$m=I_{11}/I_{peak} \qquad (I)$$

and must be at least 0.6 according to the above-mentioned CD industrial standard. The modulated photocurrent is caused by reflection differences between inscribed (amorphous) and uninscribed (crystalline) areas of the information carrier.

In practice, it has been found that in the case of information carriers in which $R_H \geq 70\%$, the contribution of phase differences to the modulation is almost always negligibly small. This modulation is predominantly based on reflection differences. These information carriers must have a minimum optical contrast in order to attain the required modulation of m=0.6. The optical contrast C is defined as:

$$C=100(R_H-R_L)/R_H \qquad (II)$$

In this equation, $R_H$ has the above-mentioned meaning and $R_L$ is the reflection of the amorphous layer as deposited. In practice, the modulation is lower than the optical contrast. This can be attributed, inter alia, to the relatively large diameter of the laser spot relative to the width of the amorphous bit. In addition, the reflection of an inscribed amorphous bit differs from that of an amorphous layer as deposited. The amorphous bit may also comprise a small quantity of crystalline material. Experiments have shown that the necessary optical contrast C must be higher than 60%, namely at least 80%, to meet the modulation requirement of m=0.6. Since $R_H$ must be at least 70%, $R_L$ must be below 14%.

In addition to the above-mentioned optical requirements, it is most desirable that, simultaneously, information can be erased and new information inscribed in an information carrier by means of the same laser-light beam. This process is commonly referred to as Direct Overwrite (DOW); it has the advantage that a separate erasing step is superfluous. Given the linear disc rate of 1.2–1.4 m/s, laid down in the above-mentioned CD-industrial standard, experiments carried out by Applicants have shown that the time $t_e$ necessary to completely erase an amorphous bit in a crystalline environment (i.e. recrystallization) should be between 300 and 800 ns. This can be attributed to the fact that the time during which an amorphous bit on the rotating optical information disc is exposed to the laser-light beam is short. At such a linear disc velocity, complete recrystallization of an amorphous bit is impossible if $t_e$ is above 800 ns, as the time available for this purpose is too short. If $t_e$ is below 300 ns there is a risk that during inscribing of an amorphous bit, the locally and temporarily increased temperature will cause said bit to recrystallize completely or partly, so that eventually no amorphous bit or a faulty one is formed.

It has been found to be difficult to manufacture an inscribable and erasable information carrier, which meets the requirements of the above-mentioned CD-industrial standard and which can suitably be used for DOW.

An information carrier of the type mentioned in the opening paragraph is known from European Patent Application EP-A-549024 (PHN 13.925), filed by Applicants. The known information carrier of the phase-change type comprises a substrate carrying a stack of layers consisting, in succession, of a first reflective layer, a first dielectric layer, a recording layer of a phase-change GeTe alloy, a second dielectric layer and a second reflective layer. Such a stack of layers can be referred to as an MIPIM structure, wherein M represents a reflective layer, I represents a dielectric layer and P represents a phase-change recording layer. Such a MIPIM structure enables a high initial reflection $R_H$ as well as a sufficiently high contrast C to be attained, so that said structure complies with the CD-industrial standard. Viewed from the substrate, the known information carrier comprises, for example, a semi-transparent thin Au-reflective layer, a $Ta_2O_5$ dielectric layer, a GeTe recording layer, a $Ta_2O_5$ dielectric layer and an optically non-transparent Au layer. Interference effects cause both the initial reflection and the contrast of the information carrier to be increased. In the known laminar structure, the reflections of the crystalline layer and of the amorphous layer, as deposited, are 70% and 12%, respectively. The optical contrast C is 83% and, thus, the information carrier complies with the CD-industrial standard. In addition to GeTe, said Patent Application also states alloys of GeTe with Sb and alloys comprising In, Sb, Se, Sn and/or Ga. A problem of the known information carrier comprising a recording layer of GeTe which optically complies with the CD-industrial standard is, however, that said information carrier is unsuitable for DOW at linear disc rates of 1.2–1.4 m/s. This is because the time $t_e$ which is necessary for complete recrystallization of an amorphous bit in GeTe is only 50 ns, so that the inscribed bits are immediately erased again.

It is an object of the invention to provide, inter alia, an inscribable and erasable optical information carrier which, in the inscribed state, complies with the CD-industrial standard, more particularly, with the initial reflection requirement of $R_H \geq 70\%$ and the modulation requirement of $m \geq 0.6$, and which optical information carrier can also suitably be used for Direct Overwrite at a linear velocity of the information carrier of 1.2–1.4 m/s. In order to meet the modulation requirement m, the optical contrast C must be at least 80%.

The invention also aims at providing a method of manufacturing such an optical information carrier, in which the applied recording layer, which is originally completely amorphous, can be crystallized (initialized) into the desired recording layer by means of a laser-light beam. The latter requirement will be explained hereinbelow.

The object of providing an optical information carrier which complies with the CD-industrial standard, is achieved in accordance with the invention by an optical information carrier as described in the opening paragraph, which is characterized in that the recording layer comprises an alloy of the composition, in atom %, $Ge_xTe_ySe_z$, wherein $47 \leq x \leq 53$ $17 \leq y \leq 41$ $12 \leq z \leq 30$ and $x+y+z \geq 96$.

To influence the crystallization temperature, the number of times that the layer can be erased and inscribed (cyclability) and the life of the recording layer, without exerting too negative an effect on the optical properties and/or erase times, the recording layer may maximally comprise 4 atom % O, Sb, N or Bi. For the simplicity of the recording layer, it is preferred that x+y+z=100 atom %.

The composition in accordance with the invention can be represented as an area in a ternary triangular diagram in which the atomic percentages of Ge, Te and Se are given along the axes (see FIG. 1), said area constituting a parallelogram with the following vertices:

$Ge_{47}Te_{41}Se_{12}$     (A)

$Ge_{47}Te_{23}Se_{30}$     (B)

$Ge_{53}Te_{17}Se_{30}$     (C)

$Ge_{53}Te_{35}Se_{12}$     (D).

Experiments carried out by Applicants have shown that if the composition of the recording layer is outside these limits, the modulation m does not comply with the CD-industrial standard and/or the erase time $t_e$ lies outside the above-mentioned range from 300 to 800 ns, so that DOW is impossible at the given linear disc velocity. The erase time $t_e$ and the optical contrast C can be increased by adding Se to the recording layer of Ge (Ge ranging between 47 and 53 atom %) and Te. DOW is possible if the Se content is at least 6 atom %. However, if the modulation requirement is to be met also, the Se content must be limited to between 12 and 30 atom %. Below 12 atom % Se, the optical contrast C and the modulation m decrease too much and above 30 atom % Se they decrease drastically.

It has been found that only a small deviation of the Ge content of the recording layer from 50 atom % is permitted, namely maximally ±3 atom %. Outside these limits the contrast C and the modulation m decrease drastically, as a result of which the information carrier no longer complies with the CD-industrial standard. Within said limits, an optical contrast C of minimally 80% and, in addition, an initial reflection $R_H$ of at least 70% can be attained.

Preferably, x, y and z have the following values (in atom %):

$48 \leq x \leq 52$ $20 \leq y \leq 34$ $18 \leq z \leq 28$.

This composition is situated in the hatched parallelogram having the following vertices (see FIG. 1):

$Ge_{48}Te_{34}Se_{18}$ $Ge_{48}Te_{24}Se_{28}$ $Ge_{52}Te_{20}Se_{28}$ $Ge_{52}Te_{30}Se_{18}$.

These closer limits result in a greater contrast C and hence a greater modulation m of the information carrier. Within said closer limits, an optical contrast C of minimally 86% and, in addition, an initial reflection $R_H$ of at least 70% can be attained.

Preferably, the alloy $Ge_{50}Te_{50-z}Se_z$ is used, wherein $12 \leq z \leq 30$ atom % and, preferably, $18 \leq z \leq 28$ atom %. A very suitable alloy having a high contrast C is $Ge_{50}Te_{25}Se_{25}$.

The reflective layer M of the MIPIM structure situated on the substrate side may consist of a metal or metal alloy of the elements Au, Al, Cu and Ag. This reflective layer M is semi-transparent and has a transmission coefficient which is, for example, in excess of 0.2. The reflective layer M may also be a dielectric mirror consisting of a stack of dielectric layers having alternately higher and lower refractive indices, for example $Ta_2O_5$ and $SiO_2$, respectively.

The reflective layer M on the outside of the optical information carrier is, preferably, a non-transparent metal layer which consists, for example, of a metal or metal alloy of the elements Au, Al, Cu or Ag, so that as little laser-light as possible is transmitted by the reflective layer. Owing to the high degree of reflection at a laser wavelength of 785 nm and the corrosion resistance, preferably, Au is used for the reflective layers M.

By adding dielectric layers I as interference layers, both the reflection and the contrast of the information carrier are increased. In addition, said dielectric layers protect the recording layer P against possible oxidation and they preclude diffusion of the metal from the reflective layers M into the recording layer P. Said dielectric layers also ensure a controlled removal of heat when amorphous bits are inscribed into the recording layer.

For the dielectric layers use can be made of customary materials, such as $SiO_2$, $TiO_2$, ZnS, AlN or $Ta_2O_5$. Mixtures of these materials, such as a mixture of ZnS and $SiO_2$, can alternatively be used. The dielectric layers must be transparent to the laser wavelength used. Both the reflective layers and the dielectric layers can be provided by vapour deposition or sputtering.

The layer thicknesses of the MIPIM structure are selected so that C is maximized and $R_H$ is at least 70%.

The substrate of the information carrier is at least transparent to the laser wavelength of 770–830 nm used for reading and is made of, for example, polycarbonate, polymethyl methacrylate (PMMA), amorphous polyolefin or glass. The substrate must also be transparent to the laser wavelength used for inscribing and erasing. According to the CD-industrial standard, the information carrier is disc-shaped and has a diameter of 120 mm, and the thickness of the substrate is 1.2 mm.

The surface of the substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer of, for example, a UV light-cured layer of acrylates, which is separately provided on the substrate. Such a groove has a pitch of 1.6 μm and a width of, for example, 0.6 μm.

Optionally, the outermost layer of the stack is screened from the environment by means of a protective layer of, for example, UV light-cured poly(meth)acrylate.

Although the GeTeSe alloy in accordance with the invention is optimized for an erasable recording layer in an information carrier which complies with the CD-industrial standard, said alloy can also suitably be used in other optical information carriers, such as information carriers which are not disc-shaped and which require a great optical contrast and modulation. For this purpose, flexible, for example tape-shaped, substrates can be used.

The recording layer can be applied to the substrate by vapour depositing or sputtering of a suitable target. The layer thus applied is amorphous and exhibits a low reflection. In order to constitute a suitable recording layer having a high reflection, this layer must first be completely crystallized, which is commonly referred to as initialization. For this purpose, the information carrier could be heated to the crystallization temperature of the relevant GeTeSe alloy in a furnace, the crystallization temperature being close to 250° C. This method is unsuitable for synthetic resin substrates, such as polycarbonate. It would alternatively be possible to initialize the amorphous layer with a laser-light beam of sufficient power, for example in a recorder, in which case the laser-light beam scans the rotating information carrier. The amorphous layer is then locally heated to the crystallization temperature without the substrate being subjected to a disadvantageous heat load.

Experiments have shown, however, that the amorphous GeTeSe alloys having a composition in accordance with the invention cannot be initialized with a laser-light beam within 10 μs, whereas amorphous bits can be erased, i.e. crystallized, within 800 ns. This phenomenon, which is peculiar on first sight, can be explained as follows. Crystallization of amorphous material requires two separate processes, namely nucleation and growth. Nucleation is the process in which small crystals develop in an amorphous environment. Growth is the process in which the volume of a small crystal increases. The velocities of both processes are strongly temperature-dependent but can differ widely. Crystallization of a homogeneous amorphous layer requires both nucleation and growth. In the case of an amorphous bit in a crystalline environment, however, nucleation is not necessary because the crystals can grow along the edge of the bit towards the centre of the bit. Consequently, an amorphous bit can be erased (crystallized) very rapidly. Alloys in accordance with the invention, such as $Ge_{50}Te_{32}Se_{18}$ and $Ge_{50}Te_{25}Se_{25}$ have an erase time of an amorphous bit $t_e$ of, respectively, 350 and 600 ns and are hence suitable for CD-E (erasable). A homogeneous amorphous layer made of these alloys has a crystallization time which substantially exceeds 25,000 ns (>25 μs) and initialization of said alloys by means of a laser-light beam is very troublesome.

The object of providing a method of manufacturing an optical information carrier as described above, which can be initialized by means of a laser-light beam and which enables the dielectric layers I and reflective layers M to be provided on the substrate in a customary manner, is achieved in accordance with the invention in that the recording layer is formed of two superposed amorphous layers, the first layer having a first layer thickness being an alloy of, predominantly, Ge and Te, and the second layer having a second layer thickness being an alloy of, predominantly, Ge and Se, the compositions and the layer thicknesses being selected so that after heating and mixing of the two layers by means of a laser-light beam and after cooling of said layers, a crystalline recording layer $Ge_xTe_ySe_z$ is formed, wherein x, y and z have the above-mentioned values.

In accordance with the invention, the recording layer is provided as a double layer of two superposed, different, phase-change layers of, for example, GeTe and GeSe. The compositions and layer thicknesses are selected so that the average composition corresponds to the desired composition. One of said two layers (GeTe) has the property that it nucleates readily, whereafter it crystallizes. A laser-light beam of sufficient power causes the two layers to mix, whereafter, after cooling, a single crystalline layer of the average composition is formed.

A homogeneous amorphous layer of $Ge_{50}Te_{25}Se_{25}$ has a nucleation time of more than 1 ms (>$10^6$ ns) and, consequently, initialization by means of a laser-light beam is very troublesome despite the fact that the erase time of an amorphous bit is only 600 ns. If a double layer consisting of amorphous $Ge_{50}Te_{50}$ and amorphous $Ge_{50}Se_{50}$ of the same layer thicknesses is provided, the very rapid nucleation of the $Ge_{50}Te_{50}$ layer causes, when heating said layer, crystallization (initialization) and mixing of the double layer within 2 μs, resulting in the formation of one crystalline layer. Such a short crystallization time enables the amorphous double layer to be initialized in a recorder. The composition of the crystallized layer is $Ge_{50}Te_{25}Se_{25}$ and said layer has the same properties as a layer of the same composition which is applied as one amorphous layer and then crystallized.

It is noted that in European Patent Specification EP-B-217293, a description is given of reversible, optical recording layers consisting of alloys of Te—Ge—Sb, wherein Te can be partly replaced by Se. Measurements carried out by Applicants have shown that these alloys do not meet the requirements for CD-E. For example, the alloy $Ge_{39}Te_{52}Sb_9$ has an erase time $t_e$ of only 30 ns, so that these alloys are unsuitable for Direct Overwrite. In addition, the optical contrast C of an optical information carrier comprising such a layer amounts to 74% in the above-mentioned MIPIM structure, which is insufficient for the required modulation. An alloy of the composition $Ge_{39}Te_{40}Se_{12}Sb_9$ exhibits, under the same conditions, an erase time $t_e$ of 550 ns, however, the optical contrast C and the modulation m are only, respectively, 67% and 44%.

Figure 4:
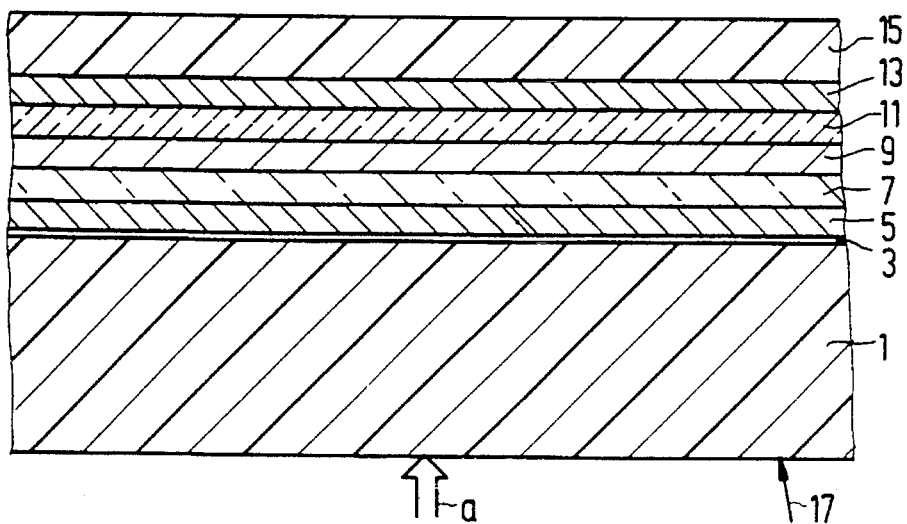
Figure 2:
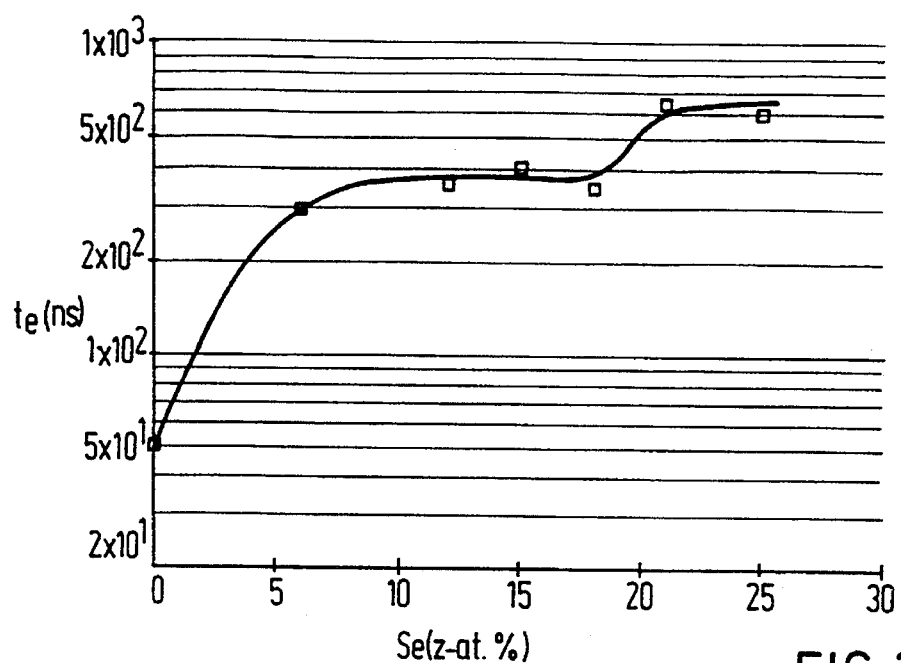
Figure 3:
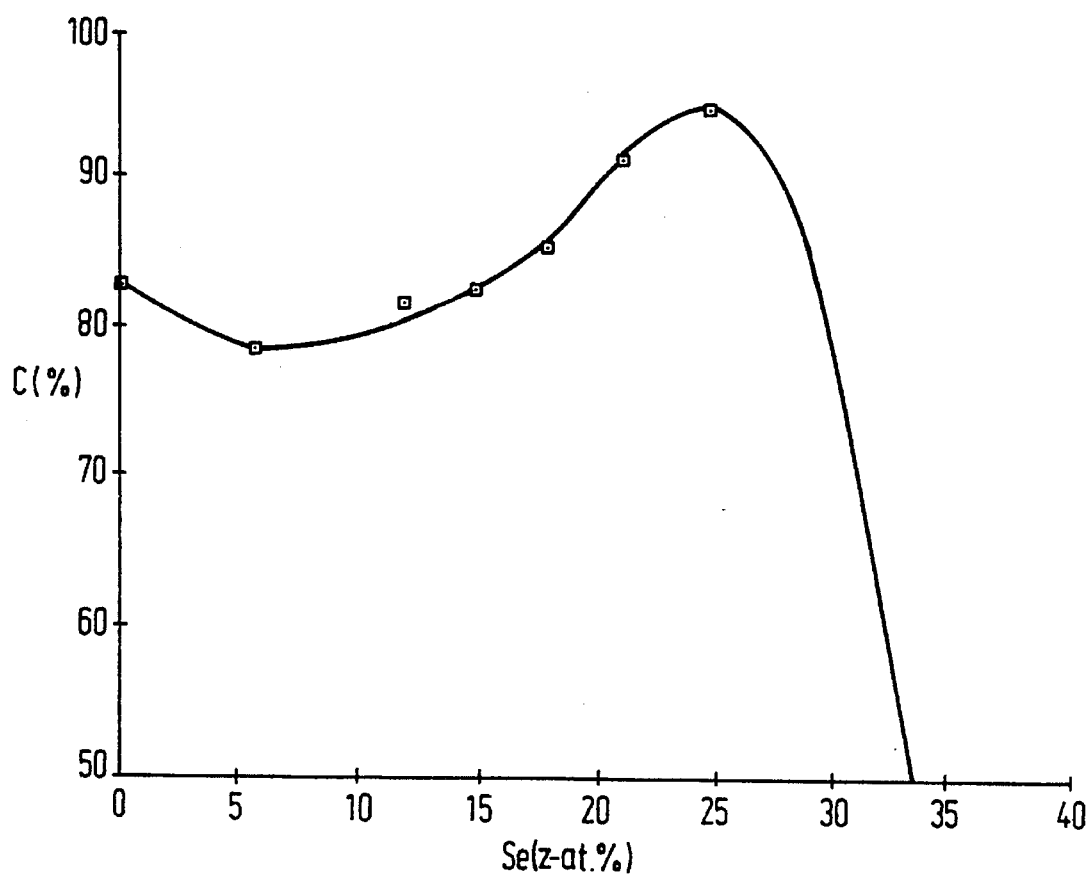

The invention will be explained in greater detail by means of exemplary embodiments and with reference to the accompanying drawings, in which FIG. 1 shows the ternary compositional diagram Ge—Te—Se, in atom %, and, in said diagram, the compositional area ABCD in the form of a parallelogram and the hatched preferred area in accordance with the invention, FIG. 2 shows the erase time $t_e$, in ns, as a function of the Se content z, in atom %, of the alloy $Ge_{50}Te_{50-z}Se_z$, FIG. 3 shows the optical contrast C, in %, of an information carrier in which $R_H$=70%, as a function of the Se content z, in atom %, of the alloy $Ge_{50}Te_{50-z}Se_z$, and FIG. 4 is a schematic cross-sectional view of an optical information carrier in accordance with the invention.

EXEMPLARY EMBODIMENT 1

FIG. 2 shows the relationship between the erase time $t_e$ (in ns) of an amorphous bit in a crystalline layer of the alloy $Ge_{50}Te_{50-z}Se_z$ and the Se-content z (in atom %). The layer is deposited as an amorphous layer by sputtering of a target of the relevant composition and is subsequently crystallized in a furnace to form a homogeneous layer. The layer is situated between two dielectric layers of $Ta_2O_5$ having a thickness of 185 nm. In these experiments the layer is stationary with respect to the laser-light beam and the beam is directed to the centre of the amorphous bit. The erase time $t_e$ is defined by the minimum laser-pulse duration necessary to completely crystallize the amorphous bit. These experiments show that for compositions having an Se content z of at least 6 atom % Se, the erase time $t_e$ is in the suitable range from 300 to 800 ns, so that these compositions are suitable for Direct Overwrite at a linear disc velocity of 1.2–1.4 m/s.

FIG. 3 shows the relationship between the optical contrast C (in % in accordance with formula II) of an information carrier in which $R_H$=70%, and the Se content z (in atom %) of the same alloys for the recording layer. This relationship shows that in an area where $t_e$>300 ns, a minimum contrast C of 80% requires an Se content z of at least 12 atom %. Above 25 atom % Se, the contrast C decreases drastically. Above 30 atom % Se, the optical contrast C is less than 81%. This means that the alloy $Ge_{50}Te_{50-z}Se_z$ is suitable for CD-E if 12%<z<30 atom %.

EXEMPLARY EMBODIMENT 2

FIG. 4 schematically shows a part of a cross-section of an optical information disc in accordance with the invention. Reference numeral 1 denotes a glass disc-shaped substrate having a diameter of 120 mm and a thickness of 1.2 min. One side of the substrate is provided with a spiral-shaped servotrack (not shown) in the form of a groove. This groove is provided in a UV-light cured layer of acrylates by means of a replication process. A very thin layer 3 of $Ta_2O_5$ having a thickness of 5 nm is applied to this layer of acrylates in which a groove is formed. Said layer 3 serves as a bonding layer for the gold layer 5 to be subsequently provided. The layer 3 is provided with a stack of the following structure:

reflective layer 5 of 15 nm Au dielectric layer 7 of 20 nm $Ta_2O_5$ recording layer 9 of 25 nm $Ge_{50}Te_{25}Se_{25}$ dielectric layer 11 of 27 nm $Ta_2O_5$, and reflective layer 13 of 75 nm Au.

Said layers can be provided by means of sputtering or vacuum deposition. After sputtering, the recording layer 9 is amorphous and is converted to a crystalline layer by means of a temperature treatment. A 10 μm thick protective layer 15 of a UV light-curable acrylate lacquer is spin coated onto the reflective layer 13.

The alloy of the recording layer 9 is a reversible crystalline-amorphous phase-change material. A laser-light beam for inscribing, reading and, optionally, erasing of information enters the information carrier via the entrance face 17 of the substrate 1. This beam is schematically represented by arrow a. During inscribing, the information carrier rotates at a constant linear velocity of 1.2–1.4 m/s and amorphous bits are formed in the crystalline recording layer 9 as a result of the action of a modulated laser-light beam having a peak power of 60 mW. The above layer structure results in calculated reflections for the crystalline and amorphous states (as deposited) of 70.5% and 4.1%, respectively, at room temperature. The optical contrast C then amounts to 94%. The measured reflections of the information carrier are 71% and 10%, respectively, and the modulation m is 0.61 (formula I). Consequently, the initial reflection and the modulation comply with the CD-industrial standard and the inscribed information carrier can be played back in a standard CD player.

The erase time of the amorphous bits is 600 ns, so that the information can be erased by means of a laser-light beam at a linear disc velocity of 1.2–1.4 m/s and Direct Overwrite is possible. Thus, the inscribed information carrier complies with the CD-industrial standard.

EXEMPLARY EMBODIMENT 3

Exemplary embodiment 2 is repeated, using recording layers 9 having different compositions of Ge, Te, and Se. The erase time $t_e$ (in ns) of the amorphous bits is determined for the information carriers obtained, and the reflections of the crystalline and amorphous areas $R_H$ and $R_L$, respectively, (in %) are calculated. By means of formula II, the optical contrast C (in %) is calculated from said data. The stack of layers is optimized in such a manner that the reflection $R_H$ is 70%. The results are listed in the following Table.

TABLE

| No. | composition (atom %) | | | | $t_e$ (ns) | $R_H$ (%) | $R_L$ (%) | C (%) |
| --- | --- | --- | --- | --- | --- | --- | --- | --- |
| | Ge | Te | Se | Sb | | | | |
| 1 | 50 | 38 | 12 | — | 350 | 70 | 12.4 | 82 |
| 2 | 50 | 35 | 15 | — | 400 | 70 | 11.9 | 83 |
| 3 | 50 | 32 | 18 | — | 350 | 70 | 9.6 | 86 |
| 4 | 50 | 29 | 21 | — | 650 | 70 | 6.1 | 91 |
| 5 | 50 | 25 | 25 | — | 600 | 70 | 3.7 | 95 |
| 6 | 48 | 27.8 | 20.2 | 4 | 300 | 70 | 10.8 | 85 |
| 7 | 50 | 44 | 6 | — | 300 | 70 | 14.6 | 79 |
| 8 | 50 | 15 | 35 | — | — | 70 | 44.7 | 36 |
| 9 | 50 | 50 | 0 | — | 50 | 70 | 12.0 | 83 |
| 10 | 47.6 | 42.9 | 9.5 | — | 250 | 70 | 22.8 | 67 |
| 11 | 45.5 | 36.4 | 18.1 | — | 2000 | 70 | 30.3 | 57 |
| 12 | 53.1 | 35.8 | 11.1 | — | 650 | 70 | 20.0 | 71 |
| 13 | 54.2 | 29.4 | 16.4 | — | — | 70 | 61.4 | 12 |
| 14 | 55.5 | 22.2 | 22.3 | — | — | 70 | 58.4 | 17 |
| 15 | 56.9 | 32.7 | 10.4 | — | 1200 | 70 | — | — |
| 16 | 59.7 | 25.8 | 14.5 | — | — | 70 | 62.0 | 11 |
| 17 | 62.6 | 18.7 | 18.7 | — | — | 70 | 59.7 | 15 |
| 18 | 48 | 36.5 | 11.5 | 4 | 170 | 70 | 13.3 | 81 |

GeTeSe alloys 1–6 are alloys which can suitably be used for optical information carriers in accordance with the invention. The alloys 1–5 lie within the parallelogram ABCD of FIG. 1. Information carriers comprising these alloys as the recording layer exhibit a contrast C of minimally 80% at an $R_H$-value of 70% and an erase time $t_e$ of between 300 and 800 ns. These alloys enable an optical information carrier in accordance with the CD-industrial standard to be manufactured. The experiments 3, 4 and 5 are within the hatched area of FIG. 1 and exhibit a very high contrast C at an $R_H$-value of 70%. The alloy of experiment 6 comprises 4 atom % Sb and has an erase time $t_e$ of 300 ns, so that it is just within the required range of 300–800 ns.

The alloys 7–18 exhibit either too low a contrast C, or an unsuitable erase time $t_e$, i.e. outside the range 300–800 ns.

The information carrier in accordance with the invention is an inscribable and erasable optical information carrier which, in the inscribed state, complies with the CD-industrial standard and is suitable for Direct Overwrite.

We claim:

1. An optical information carrier for inscribing, reading and erasing information by means of a laser-light beam, said optical information carrier comprising a substrate carrying a stack of layers, which stack compises, in succession, a first reflective layer, a first dielectric layer, a recording layer of a phase-change material of an alloy comprising germanium and tellurium, a second dielectric layer and a second reflective layer, characterized in that the recording layer comprises an alloy of the composition, in atom %, $Ge_xTe_ySe_z$, wherein $47 \leq x \leq 53$ $17 \leq y \leq 41$ $12 \leq z \leq 30$ and $x+y+z \geq 96$.

2. An optical information carrier as claimed in claim 1, characterized in that $x+y+z=100$.

3. An optical information carrier as claimed in claim 1, characterized in that x, y and z have the following values:

$48 \leq x \leq 52$ $20 \leq y \leq 34$ $18 \leq z \leq 28$.

4. An optical information carrier as claimed in claim 1, characterized in that the composition of the recording layer is $Ge_{50}Te_{50-z}Se_z$, wherein $12 \leq z \leq 30$.

5. An optical information carrier as claimed in claim 1, characterized in that the reflective layers contain gold.

6. An optical information carrier as claimed in claim 1, characterized in that the substrate comprises a servotrack for the laser-light beam.

7. A method of manufacturing an optical information carrier as claimed in claim 1, having a crystaline recording layer, the dielectric layers and reflective layers being provided on the substrate in a customary manner, characterized in that the recording layer is formed of two superposed amorphous layers, the first layer having a first layer thickness being an alloy of, predominantly, Ge and Te, and the second layer having a second layer thickness being an alloy of, predominantly, Ge and Se, the compositions and the layer thicknesses being selected so that after heating and mixing of the two layers by means of a laser-light beam and after cooling of said layers, a crystalline recording layer $Ge_xTe_y$-$Se_z$ is formed, wherein x, y and z have the above-mentioned values.

8. A method as claimed in claim 7, characterized in that the two amorphous layers are sputtered in equal thicknesses, for the first layer use being made of the alloy $Ge_{50}Te_{50}$ and for the second layer use being made of the alloy $Ge_{50}Se_{50}$, thereby forming the crystalline recording layer of the composition $Ge_{50}Te_{25}Se_{25}$.

9. An optical recording medium comprising a recording layer of a phase-change material of an alloy of the composition, in atom %, $Ge_xTe_ySe_z$, wherein $47 \leq x \leq 53$ $17 \leq y \leq 41$ $12 \leq z \leq 30$.

* * * * *